(12) United States Patent
Berrux et al.

(10) Patent No.: US 8,071,219 B2
(45) Date of Patent: Dec. 6, 2011

(54) CULINARY ITEM PRESENTING IMPROVED HYDROPHOBIC PROPERTIES AND METHOD OF MANUFACTURING SUCH AN ITEM

(75) Inventors: Aurélien Berrux, Chambery (FR); Pierre-Jean Muller, Saint Felix (FR); Jean-Luc Perillon, Chateaux (FR)

(73) Assignee: SEB S.A., Ecully (FR)

( * ) Notice: Subject to any disclaimer, the term of this patent is extended or adjusted under 35 U.S.C. 154(b) by 1037 days.

(21) Appl. No.: 11/830,082

(22) Filed: Jul. 30, 2007

(65) Prior Publication Data

US 2008/0032122 A1 Feb. 7, 2008

(30) Foreign Application Priority Data

Jul. 31, 2006 (FR) .................................. 06 07012

(51) Int. Cl.
*B32B 9/00* (2006.01)
(52) U.S. Cl. ..... 428/446; 428/447; 428/450; 428/425.5; 428/429
(58) Field of Classification Search .................. 428/145, 428/332, 336, 384, 425.5, 429, 446, 447, 428/702
See application file for complete search history.

(56) References Cited

U.S. PATENT DOCUMENTS

| | | |
|---|---|---|
| 3,202,542 A | 8/1965 | Poje |
| 3,318,717 A | 5/1967 | Simpson |
| 3,463,660 A | 8/1969 | Bentley et al. |
| 3,788,513 A * | 1/1974 | Racz ............................. 428/622 |
| 4,250,215 A * | 2/1981 | Mayer ....................... 206/524.3 |
| 4,477,517 A * | 10/1984 | Rummel ....................... 428/324 |
| 5,457,166 A * | 10/1995 | Yoshikawa et al. ........... 525/446 |
| 6,901,687 B2 * | 6/2005 | Krings et al. ..................... 38/93 |
| 2002/0076565 A1 * | 6/2002 | Fairbourn ..................... 428/457 |
| 2003/0138661 A1 | 7/2003 | Souchard et al. |
| 2005/0266235 A1 * | 12/2005 | Nakajima et al. ............. 428/336 |
| 2006/0251837 A1 * | 11/2006 | Cnossen et al. .............. 428/35.7 |
| 2007/0218297 A1 * | 9/2007 | Jeon et al. ..................... 428/447 |

FOREIGN PATENT DOCUMENTS

| | | |
|---|---|---|
| DE | 10163646 A1 | 7/2003 |
| WO | WO-2004-076570 * | 9/2004 |

OTHER PUBLICATIONS

WernerBlank (www.wernerblank.com).*
ChemistryDaily- Polysimethylsiloxane (www.chemistrydaily.com).*
Dictionary (www.dictionary.com).*

* cited by examiner

*Primary Examiner* — Timothy Speer
(74) *Attorney, Agent, or Firm* — Harness, Dickey & Pierce, PLC

(57) ABSTRACT

The invention concerns a culinary item comprising a support element and a first coating of a sol-gel baked composition, said first coating overlying at least a portion of a first face of the support element, wherein said culinary item further comprises a second coating of a silicone-based baked composition overlying at least a portion of the first coating. The invention also involves a method of manufacturing such a culinary item.

23 Claims, 2 Drawing Sheets

CULINARY ITEM PRESENTING IMPROVED HYDROPHOBIC PROPERTIES AND METHOD OF MANUFACTURING SUCH AN ITEM

FIELD

This invention concerns a culinary item presenting improved hydrophobic properties and, in particular, an improved resistance to certain detergents such as those used in dishwashers. The invention also concerns the method of manufacturing such a culinary item.

BACKGROUND

Among the different ways permitting the boosting the culinary item's resistance to detergents used in the dishwasher the one shown by document US 2003/0138661 can be mentioned.

This state of the art describes specifically a culinary item presenting improved hydrophobic properties, said culinary item including a support element and a first coating, said first coating being deposited on at least one first face of the support element and being obtained by the application, then the baking, of at least one coat of a sol-gel composition.

The use of a sol-gel composition provides some hydrophobic properties to the first coating and therefore at least to the support element face of the culinary item provided with this first coating. In fact, as indicated in the document US 2003/0138661, the sol-gel composition permits implementing a protective coat that adheres to the support element, which is transparent and confers a durable chemical resistance to the support element thus covered.

A sol-gel composition is understood as a composition including a suspension or a colloidal solution of solid particle or precursors in a solvent, which by aggregation of particles, leads to the formation of a gel then to a solid, this aggregation being classically obtained under the action of a catalyst and/or temperature.

Sol-gel compositions described in the document US 2003/0138661 implement a colloid suspension of solid particles in an organic solvent, such as an alcohol. The solid particles considered by this document are the hydrolysed metallic alkoxides, in particular of titanium, zirconium, aluminium and/or silicon.

In this state of the art the sol-gel compositions are indiscriminately applied on metallic support elements, specifically on aluminium, cast-iron, steel and stainless steel. Such support elements are indicated as being either smooth, brushed or anodised in the particular case of aluminium.

However, experience shows that any type of sol-gel composition, that meets the definition given above by the document US 2003/0138661, does not allow satisfactory hydrophobic properties to be obtained.

This fact is even more true since the detergents used today in dishwashers have more and more aggressive formulations in order to optimise the cleaning performance. Such formulations combine in effect an ever higher alkalinity with the generation of nascent oxygen.

The problem posed by this invention is therefore to remedy the above mentioned drawbacks, by proposing a culinary item compatible with a cleaning method in dishwashers, even in the presence of a particularly aggressive detergent.

One solution to this problem posed is therefore to propose a culinary item presenting improved hydrophobic properties, specifically an improved resistance to detergents used in dishwashers, said culinary item include a support element and a first coating, said first coating being deposited on at least one first face of the support element and being obtained by the application, then the baking, of at least one coat of a sol-gel composition, characterised in that it also includes at least one second coating deposited on the first coating, said second coating being obtained by the application, then the baking, of at least one coat of a silicone-based compound.

In a surprising fashion, the applicant found that the realization, on a first coating obtained from a sol-gel composition, of a coating obtained from a silicone-based composition allowed the hydrophobic properties already conferred by the first coating to be considerably improved.

The method of depositing, on a first sol-gel based coating previously deposited on a metallic substrate a second coating intended to fill the pores of the first coating is known to those skilled in the art.

Thus, DE 10163646 describes an inorganic material for surface coating containing:

a substrate, that can be metallic, partially or completely covered;

a porous coating, for example a sol-gel material presenting hydrophobic properties; and a second coating, realized in a nanocomposite material, that is deposited on the porous coating to fill its pores, this second coating presenting a better mechanical behaviour than the porous coating.

However, DE 10163646 recommends not to use a silicone-based material, because it is softer and less stable from a mechanical viewpoint than a material of a nanocomposite type.

However, the applicant discovered in a surprising and unexpected manner, that if a coat obtained from a silicone is deposited over a first coating of sol-gel type, the first coating behaves as a primary base coat for this second coating that adheres thereto perfectly, and the mechanical adherence of the assembly is improved.

The culinary item according to the invention must also preserve over time, at least for the first face of the coated support element of the first coating, a similar appearance to that of a culinary item without such a first coating and not to deteriorate following repeated cleaning cycles in a dishwasher.

SUMMARY

This invention has thus as its object a culinary item of the aforementioned type, which presents improved hydrophobic properties, and specifically an improved resistance to detergents used in the dishwashers.

In one particularly preferred version of the invention, this culinary item is such that the sol-gel composition of said at least one coat includes solvent and at least two precursors, the first precursor being a compound of general formula $M_1(OR_1)_n$, $M_1$ being a metal, $R_1$ being an alkyl group and n being an integer number corresponding to the maximum valency of the metal $M_1$, the second precursor being a compound of general formula $M_2(OR_2)_{(n-p)}R_2'_p$, $M_2$ being a metal, $R_2$ being a alkyl group, $R_2'$ being a alkyl, phenyl or cyclohexyl group, n being an integer number corresponding to the maximum valency of the metal $M_2$ and p=1, $M_1$ and $M_2$ are chosen individually between Si, Zr, Ti, Sn, Al, Ce, Nb or Ln.

Sol-gel compositions including at least the two precursors corresponding to the above cited formulas permit, after baking, realizing a first coating that perfectly adheres to the first face of the support element on which this first coating is realised, that this face presents an intrinsic porosity or is on the contrary smooth.

Because of the excellent cohesion between this first face of the support element and the first coating all, phenomena of peeling originating from the alteration of this first face of the support element is avoided.

The culinary item according to this invention presents the major advantage that it can be realised with a wide choice of materials for the support.

Indeed, this material can be metallic, for example in anodised or non-anodised aluminium or in brushed, polished or microshot aluminium alloy, in polished, brushed or microshot stainless steel, in cast iron, in beaten or polished copper, in glass or in ceramics.

In the particular case where the first face of the support element presents a roughness, or even a porosity, the sol-gel composition in a way plugs the small asperities and pores and creates a barrier or protective coat, between the first face of the support element and the outside environment. This first face is thus protected from the action of detergents, in particular the particularly aggressive formulations of products used in the dishwasher that couples strong alkalinity and release of active oxygen.

This phenomenon of plugging is especially interesting when the support element of the culinary item is realised in aluminium or in aluminium alloy, and where it presents, at least on its first face, an anodisation coat on which the first coating is deposited.

The first coating realised from a sol-gel composition in accordance with the invention perfectly adheres to the anodisation coat by reason of the intrinsic porosity of this anodisation coat. The culinary item therefore displays an excellent cohesion between the anodisation coat and the first coating, which avoids all phenomena of peeling.

In a variant of the invention, the sol-gel composition of said coat includes, in addition to the first and second precursors mentioned above, a third precursor, this third precursor being a compound of general formula $M_3(OR_3)_{(n-p)}R_3'_p$, $M_3$ being a metal chosen between Si, Zr, Ti, Sn, Al, Ce, Nb or Ln, $R_3$ and $R_3'$ each being an alkyl group, n being an integer number corresponding to the maximum valency of the metal $M_3$ and p=2.

The choice of metal for $M_1$ and $M_2$, as well as for $M_3$, in the case of the aforementioned variant of the invention, is given in a preferred order in the decreasing sense, Si therefore being the metal preferably chosen.

In an advantageous, but not imperative version of the invention, the same metal is chosen $M_1$, $M_2$ and, if the case arises, $M_3$ for the two, or three, precursors.

In a preferred version of the invention the culinary item includes in addition a third non-stick coating deposited on the second face of the support element. This third non-stick coating is, for example, a coat of enamel or, preferably, a coating based on one or several fluorocarbonated resins.

Another goal of this invention consists in proposing a method of manufacturing a culinary item presenting improved hydrophobic properties, notably an improved resistance to detergents used in dishwashers, this method being of easy industrialization.

This manufacturing method includes the following stages realised on a support element that presents, preferably, the final shape of the culinary item:

the application, on at least a first face of the support element, of at least one coat of a sol-gel composition, and the baking of at least one coat to obtain a first coating.

According to the invention, this method is such as to also include the accomplishment of a second coating 3 after the realisation stage of the first coating 2, by application, then baking, of at least one coat of a silicone-based composition on the first coating 2.

The silicone-based composition can be constituted from a silicone oil or a mixture of silicones oils, or of a silicone resin or a mixture of silicone resins.

Under the heading of silicones oils usable in the silicone-based composition of this invention, can be specifically cited methyl-phenyl silicones and methyl silicones.

Under the heading of methyl-phenyl silicone oils, can be specifically mentioned the non-edible oils marketed by the WACKER company under the commercial denomination WACKER SILICONOL AP150 and by the DOW CORNING company under the commercial denomination DOW CORNING 550 fluids, as well as the edible oils marketed by the WACKER company under the commercial denomination WACKER SILICONOL AR00.

Under the heading of methyl silicone oil, can be specifically mentioned oil marketed by the RHODIA company under the commercial denomination RHODIA 47 VS 350.

Under the heading of silicone resin usable in the silicone-based compound of this invention, can be specifically mentioned polyester silicone resins.

According to one variant of the method compliant with this invention, the sol-gel composition of said at least one coat includes a solvent and at least two precursors:

the first precursor is a compound of general formula $M_1(OR_1)_n$, $M_1$ being a metal, $R_1$ being a alkyl group and n being an integer number corresponding to the maximum valency of the metal $M_1$; and the second precursor being a compound of general formula $M_2(OR_2)_{(n-p)}R_2'_p$, $M_2$ being a metal, $R_2$ being a alkyl group, $R_2'$ being a alkyl, phenyl or cyclohexyl group, n being an integer number corresponding to the maximum valency of the metal $M_2$ and p=1, $M_1$ and $M_2$ being chosen individually between Si, Zr, Ti, Sn, Al, Ce, Nb or Ln.

In a preferred manner, the sol-gel composition of at least one said coat can besides include a third precursor, this third precursor is a compound of general formula $M_3(OR_3)_{(n-p)}R_3'_p$, $R_3$ being a alkyl group, $R_3$, $R_3'$ being a alkyl group, n being an integer number corresponding to the maximum valency of the metal $M_3$ and p=2, $M_3$ being a metal chosen between Si, Zr, Ti, Sn, Al, Ce, Nb or Ln.

Besides the advantage of the cohesion and the adhesion of the first coating with the first face of the support element of the culinary item, the method in accordance with the invention is especially simple to implement and can be considered easily without radically altering the classic methods of manufacturing the culinary item.

The method according to this invention presents moreover the advantage that it can be implemented without being forced to resort to a previous mechanical or chemical treatment of the first face of the support element destined to be coated by the first coating, which presents a very clear advantage from an economic and also ecological viewpoint.

DRAWINGS

Other advantages and specifics of this invention will result from the description that follows below, given by way of non restrictive example and made in reference to the attached Figures.

Figure 1:
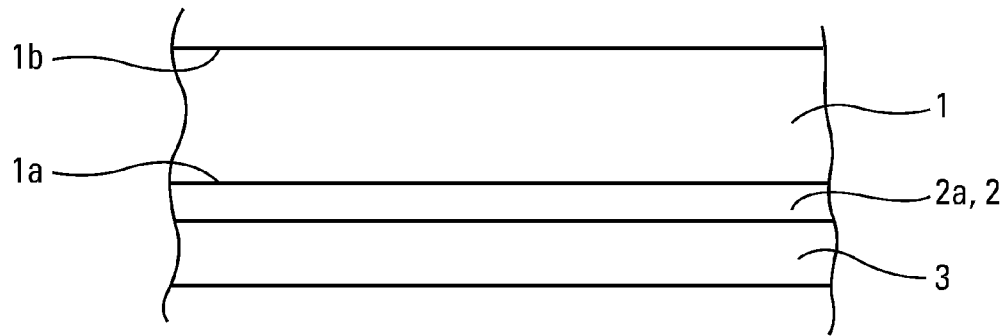
FIG. 1 represents a cross-sectional schematic view of the structure of a portion of the bottom of a culinary item according to a first variant of the invention.

Elements common to FIGS. 1 to 4 are identified by the identical numerical references.

DETAILED DESCRIPTION

On the set of FIGS. 1 to 4 a support element 1 is represented.

This support element 1 can be realised in a metal or in a metal alloy. It can be specifically in anodised or non-anodised aluminium or in brushed, polished or microshot aluminium alloy, in polished, brushed or microshot stainless steel, in cast iron, in either beaten or polished copper.

This support element 1 can also be realised in glass or in ceramics.

This support element 1 includes, at least on its first face 1a, a first coating 2 where the thickness is preferably between 1 and 40 μm, and preferably of the order of 25 μm.

A second coating 3 is deposited in addition on the first coating 2 of composition including a sol-gel.

This second coating 3 is obtained by the application, then the baking, of at least one coat 3a including a silicone. The thickness of said second silicone-based coating 3 is preferably between 15 and 25 μm.

The total thickness of the superimposed first 2 and second 3 coatings is preferably of the order of 40 μm.

The first coating 2 is constituted by a coat 2a containing a sol-gel composition.

Figure 2:
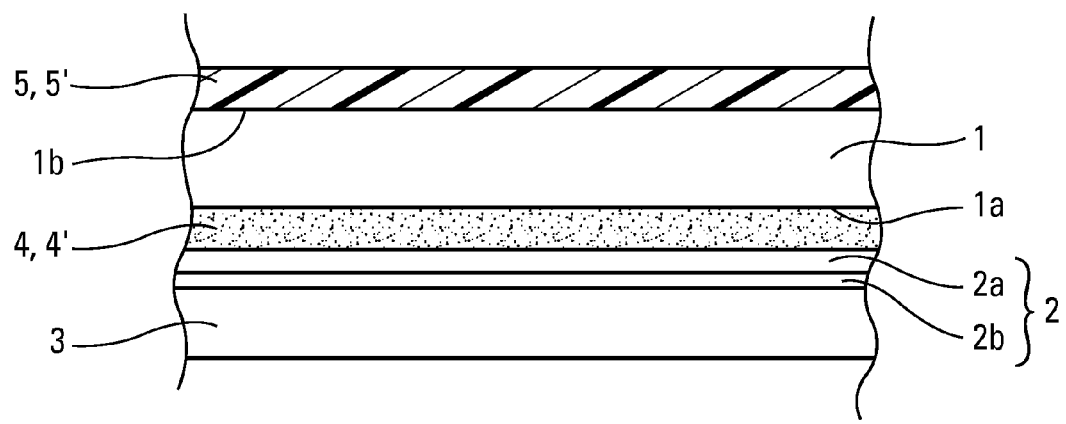
FIG. 2 represents a cross-sectional schematic view of the structure of a portion of bottom of a culinary item according to a second variant of the invention.

According to the thickness sought for this first coating 2, this will be constituted of only one coat 2a or several coats, as will be seen in the variant illustrated in FIG. 2.

In a particular version of the invention sol-gel composition implemented in the scope of this invention includes a solvent and at least two precursors, the first precursor being a metallic polyalkoxylate of general formula $M_1(OR_1)_n$, $M_1$ being a metal, $R_1$ being a alkyl group and n being an integer number corresponding to the maximum valency of the metal $M_1$, and the second precursor being a compound of general formula $M_2(OR_2)_{(n-p)}R_2'_p$, $M_2$ being a metal, $R_2$ being a alkyl group, $R_2'$ being a alkyl, phenyl or cyclohexyl group, n being an integer number corresponding to the maximum valency of the metal M2 and p=1, M1 and M2 being chosen individually between Si, Zr, Ti, Sn, Al, Ce, Nb or Ln.

Preferably, the previous sol-gel composition can include besides a third precursor, this third precursor is a compound of general formula $M_3(OR_3)_{(n-p)}R_3'_p$, $M_3$ being a metal chosen between Si, Zr, Ti, Sn, Al, Ce, Nb or Ln, $R_3$ and $R_3'$ each being a alkyl group, n being an integer number corresponding to the maximum valency of the metal $M_3$ and p=2.

More preferably, the following formulations will be retained for the first, second and, if the case arises, third precursors:

$M_1(OR_1)_n$ is such that $R_1$ is an alkyl in $C_1$-$C_4$;

$M_2(OR_2)_{(n-p)}R_2'_p$ is such that $R_2$ is a linear alkyl, preferably in $C_1$-$C_3$, and $R_2'$ is an alkyl in $C_1$-$C_3$; and, if the case arises; and $M_3(OR_3)_{(n-p)}R_3'_p$ is such that $R_3$ is a linear alkyl, preferably in $C_1$-$C_3$, and $R_3'$ is an alkyl in $C_1$-$C_3$, preferably $CH_3$ or $C_2H_5$.

Preferably, the weight proportion for each of the first, second and, if the case arises, third precursors are such that they are in the range from 10 to 50% of the first $M_1(OR_1)_n$ precursor, from 50 to 90% of the second $M_2(OR_2)_{(n-p)}R_2'_p$ precursor, and from 0 to 20% of the third $M_3(OR_3)_{(n-p)}R_3'_p$ precursor.

Advantageously, the sol-gel composition includes 30 to 99% by weight, advantageously 50 to 99% by weight, and preferably 80 to 95% by weight of solvent, and from 1 to 50% by weight, preferably between 5 and 20% by weight, of the first, second and, if the case arises, third precursors.

More preferably, the solvent is hydroxylated type, preferably a primary alcohol.

Figure 3:
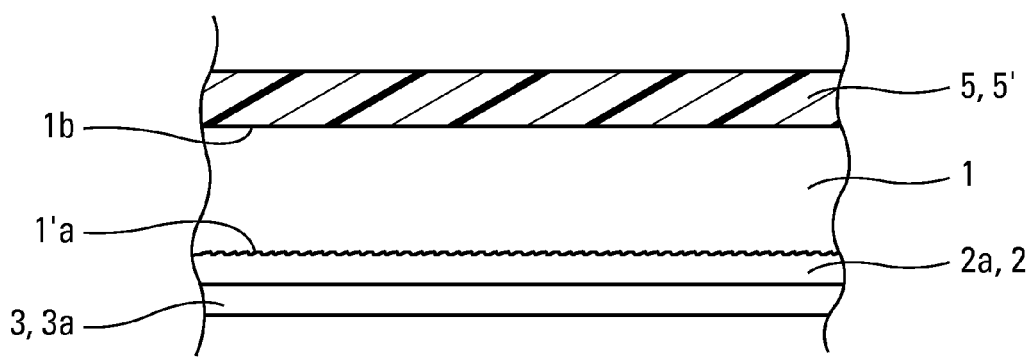
FIG. 3 represents a cross-sectional schematic view of the structure of a portion of bottom of a culinary item according to a third variant of the invention.
Figure 4:
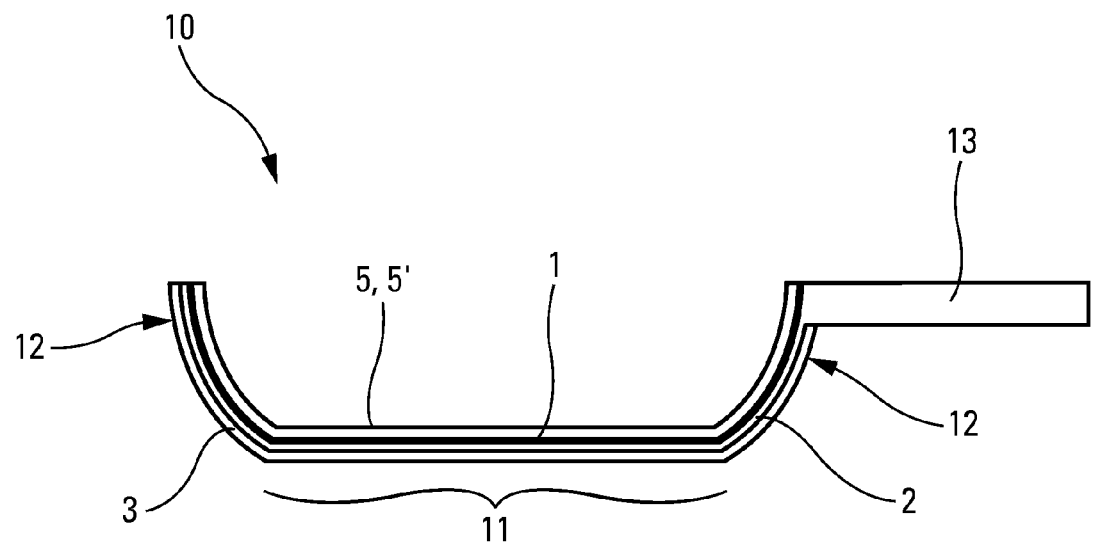
FIG. 4 represents a cross-sectional schematic view of the culinary item where the bottom portion is illustrated in FIG. 3.

The precisions relative to the sol-gel composition of coats forming the first coating 2 described above are applicable rather evidently for variants of the invention illustrated in FIGS. 3 to 5.

In the particular variant illustrated in FIG. 3 the support element 1 is realised in aluminium or in aluminium alloy and includes, at least on its first face 1a, an anodisation coat 4 that is by definition porous.

The anodisation coat 4 presents preferably a thickness between 5 and 100 μm.

Instead and in place of the anodisation coat 4 we can consider a configuration also in which this support element 1 presents, at least on its first face 1a, a first coat of enamel 4' which in contrast to the anodisation coat 4, presents a smooth surface, except for special surface treatment aiming at conferring on it a certain roughness.

In this last hypothesis, the choice of the material of the support element 1 should not be limited evidently to only aluminium or aluminium alloy. Any material that can receive an enamel coating can be used.

The thickness of the enamel coat 4' is preferably between 40 and 100 μm.

On this anodisation coat 4, or on this enamel coat 4', the first coating 2 is deposited. As already indicated previously, the thickness of the first coating 2 is preferably between 1 and 40 μm.

According to the thickness sought for this first coating 2 this will be constituted by one or several coats. In any case, every coat of the first coating 2 will be realised from a sol-gel composition.

On FIG. 1 the first coating 2 is constituted of single coat 2a containing a sol-gel composition compliant with the invention and is detailed above.

On FIG. 2 the first coating 2 is constituted of two coats 2a and 2b, both containing a sol-gel composition.

Nothing prevents considering a structure of first coating 2 that would include three, or even more, coats of a sol-gel composition.

However, in practice, notably in the concern over the limitation of industrial costs it is observed that a first coating 2 containing four or five coats does not contribute any supplementary action with regard to a first coating 2 formed of two or three coats.

On the contrary, in the particular case of a culinary item including an anodisation coat 4, besides the fact of decreasing the action of "stone" appearance of the aluminium anodised considerably, a too high a number of coats can lead to the attainment of micro-cracks damaging the sealing of the protective coat formed by the first coating 2.

When the first coating 2 is comprised of two coats 2a, 2b, or more, the sol-gel composition of each coat 2a, 2b is preferably identical, for reasons of industrial cost limitation.

However, it is also possible to perform a first coating 2 in which in at least two of coats constituting it would be realised from different sol-gel compositions, under provision that the different sol-gel compositions implemented in the different coats are very evidently compatible to confer the plugging properties, and therefore the hydrophobicity sought for the item covered.

As represented in FIG. 2, the second face 1b of the support element 1, opposite the first face 1a, is coated with a third non-stick coating 5, 5', which presents moreover hydrophobic properties.

This third non-stick coating can be constituted by at least one coat of enamel 5', or more generally at least one thermostable resin-based coat withstanding at least 200° C.

In the case where the third non-stick coating 5 is obtained from a compound including a thermostable resin withstanding at least 200° C., this thermostable resin including classically a fluorocarbonated resin, alone or mixed with one or several other thermostable resins withstanding at least 200° C.

This fluorocarbonated resin, whose hydrophobic properties are recognized, can be polytetrafluoroethylene (PTFE), a tetrafluoroethylene and perfluoropropylvinylether copolymer (PFA) or a tetrafluoroethylene and hexafluoropropylene copolymer (FEP) or a mixture of these fluorocarbonated resins.

The other thermostable resins withstanding at least 200° C. can be a polyamide imide (PAI), a polyethylene sulfone (PES), a polyphenylene sulfide (PPS), a polyethercetone (PEK), a polyetherethercetone (PEEK) or a silicone.

The thickness of the third non-stick coating 5,5' is preferably between 30 and 45 µm.

A third variant of the invention is illustrated in FIG. 3.

In this FIG. 3, the first face 1a' of this support element 1 presents a certain roughness, for example carried out by a prior mechanical or chemical treatment.

The first coating 2 of sol-gel composition is deposited on this first face 1a' while the third non-stick coating 5, 5' is deposited on the second face 1b, the second coating 3 being deposited on the first coating 2 of sol-gel type.

Examples of sol-gel compositions suited for the realisation of a culinary item according to the invention whatever the variant considered for the realisation of this culinary item, are indicated below.

The method of preparation is identical and takes place in the following manner: precursors are introduced into the solvent, under mixing, then, still under mixing, a catalytic solution.

This catalytic solution is preferably an acidic aqueous solution, for example a molar solution of HCl hydrochloric acid. In a more especially preferred manner, the molar $H_2O/M$ ratio is between 1 and 2.5.

After introduction of the acidic aqueous solution, the mixture thus obtained is allowed to react under mixing for 150±30 minutes then rest during a minimum of 12 hours.

Sol-Gel Composition A

In a thermostatically controlled enclosure at 23° C. is introduced, in a beaker, 800 g of ethanol then, successively and under mixing:

20 g of $Si(OC_2H_5)_4$ tetraethylorthosilicate,
40 g of $Si(OCH_3)_3CH_3$ methyltrimethoxysilane, then
10 g of an aqueous molar HCl solution.

Stirring is maintained for 120 minutes and the mixture thus obtained allowed to rest at constant temperature for 12 hours. Sol-gel composition A is ready for application.

Sol-Gel Composition B

In a thermostatically controlled enclosure at 23° C. is introduced, in a beaker, 600 g of n-propanol, then successively under mixing:

30 g of $Si(OC_2H_5)_4$ tetraethylorthosilicate,
60 g of $Si(OCH_3)_3CH_3$ methyltrimethoxysilane,
10 g of $Si(OC_2H_5)_3C_3H_7$ propyltriethoxysilane, then
10 g of a molar aqueous solution of HCl.

The mixing is maintained for 180 minutes and the mixture thus obtained allowed to rest at constant temperature for 12 hours. The sol-gel composition B is ready for application.

Sol-Gel Composition C

In a thermostatically controlled enclosure at 23° C., 800 g of ethanol is introduced, into a beaker, then successively under mixing:

10 g of $Si(O-nC_3H_7)_4$, tetra n-propylsilicate
40 g of $Si(OC_2H_5)_3CH_3$ methyltriethoxysilane,
10 g of $Si(OC_2H_5)_3C_3H_7$ propyltriethoxysilane, then
6 g of a molar aqueous solution of HCl.

The mixing is maintained for 180 minutes and the mixture thus obtained allowed to rest, at constant temperature for 12 hours. The sol-gel composition C is ready for application.

It will be seen, in the continuation of this description, that a preferred method suitable for the application of sol-gel compositions implemented in the scope of this invention, and specifically, for the application of sol-gel compositions A, B and C that have just been described, is application by spraying.

These three sol-gel compositions A, B and C are especially suited for culinary item manufacture where to date it is strongly recommended against dishwasher cleaning. Among these items can be mentioned specifically those realised in anodised aluminium, or in anodised aluminium alloy, or those containing an enamel coating.

One example of a silicone resin-based composition, intended to form the second coating 3 and suitable for the accomplishment of a culinary item according to the invention, is given below:

Example 1

| Commercial Product | Compound | Wt. % |
| --- | --- | --- |
| TEGO HTT | polyester silicone resin marketed by the TEGO Company | 64.3% |
| BYK 101 | thinning additive for spraying marketed by the BYK-CHEMIE Company | 0.3% |
| BENTONE ® SD2 | thickening charge marketed by the RHEOX, Inc Company | 0.1% |
| ZFS 460 | wetting agent marketed by the TEGO Company | 0.3% |
| DYNEON PTFE 9207 | micronised PTFE powder marketed by the 3M Company | 6.4% |
| | diglycol butyl acetate diluent | 23.9% |
| | pyrogenic silica matting and bulking agent | 4.7% |

The method of preparation takes place in the following manner:

all the products indicated above are introduced into a ball mill with the exclusion of pyrogenic silica, these products are then ground for 1 hr 30', then pyrogenic silica is then incorporated into the mixture with mixing at 800 revs/minute and for 5 minutes.

By way of illustration are represented, in FIG. 4, a culinary item 10, in this instance, a frying pan.

This culinary item 10 include three main elements, a bottom 11, a side wall or skirt 12, as well as a handle 13 for grasping.

Preferably, the support element 1 will be manufactured first and will be shaped for including the bottom 11 for said culinary item from which the lateral wall 12 raises.

On the first face 1a of the support element 1 is deposited the first coating 2. On this first coating 2 is deposited the second coating 3, which corresponds to the outer face of the culinary item 10.

The second face 1b of the support element 1 of the culinary item 10 includes the third non-stick coating 5. This third non-stick coating 5 correspond to the inner face of the culinary item 10 that is intended to receive food, specifically for cooking.

The first and second coatings 2 and 3 thus cover all the outside surface of the bottom 11 and the side wall 12 of the culinary item 10, while the third non-stick coating 5 covers the entire interior surface of the bottom 11 and the side wall 12 of the culinary item 10.

In a first embodiment of the invention, the manufacturing method of a culinary item in accordance with the invention includes the following stages, realised for example on the support element 1 illustrated in FIGS. 1 and 2:

on at least a first face 1a of the support element 1 is applied, at least one coat 2a of a sol-gel composition including a solvent and at least the two precursors specified here above, and the baking takes place of the at least one said coat 2a to obtain the first coating 2, then on the first coating 2 is applied a coat of a silicone-based compound, and baking takes place to obtain the second coating 3.

In a second embodiment of the invention the manufacturing method includes the following stages, realised for example on the support element 1 illustrated in FIG. 3 and carried out in aluminium or in aluminium alloy:

an anodisation coat 4 is realised on at least the first face 1a of the support element 1, then, at least one coat 2a, 2b of a sol-gel composition in accordance with the invention is applied to the anodisation coat 4, then the baking of the at least one said coat 2a, 2b takes place to obtain the first coating 2, then a coat of a silicone-based compound is applied to the first coating 2, and the baking takes place to obtain the second coating 3.

The anodisation coating 4 is realised classically, for example by electrolytic treatment.

In one variant the method according to the invention can include also the realization of an enamel coating 4' on at least the first face 1a of the support element 1, prior to the realisation of the first coating 2.

In a conventional manner the enamel 4' is realised by the application, then the baking, of at least one coat including a sintered enamel.

In a third embodiment the manufacturing method according to the invention can besides include, after realizing the stage of the first coating 2, the realisation, on the second face 1b of the support element 1, of a third non-stick coating 5, 5' (see FIG. 4).

Preferably this second non-stick coating 5 is realized by the application, on the second face 1b of the support element 1, of at least one coat including a thermostable resin withstanding at least 200° C., for example a fluorocarbonated resin, such as the PTFE.

The application of the coat or coats including a thermostable resin intended to form, after sintering, the third non-stick coating 5, is realised according to methods well known by those skilled in the art and, notably by spraying. A prior mechanical treatment of the second face 1b of the support element 1, prior to this application may be undertaken advantageously.

Alternately, the application of at least one coat can proceed including a sintered enamel to obtain, after baking, the third non-stick coating 5'.

It is very evident that the different modes of realization previously described can be combined between them to achieve the manufacture of the culinary item that includes certainly the first 2 and second 3 coatings, but can include an anodisation coat 4 or an enamel coat 4', also and/or a second non-stick coating 5, 5'.

Whatever the realization method retained, that this embodiment is taken either alone or in combination with one or several other modes of realisation of the above stated stages are preferably realised on a support element 1 presenting the final shape of the culinary item 10.

This support element 1, when it is realised in metal, can be moulded specifically by stamping of a metallic disc, notably in aluminium, in aluminium alloy, stainless steel or copper.

One can consider however carrying out the moulding of the support element 1 after application of all or part of the coats, that these include a sol-gel composition, a thermostable resin or a silicone resin, applied in the scope of the method in accordance with the invention, under the reservation of industrial feasibility.

According to one preferred method of the invention the sol-gel composition-based coat or coats 2a, 2b are applied by spraying.

Any other method of application, such as dipping, by pad, brush, roller, spin coating or silk-screen printing remain foreseeable.

However, spraying, for example by spray gun presents the advantage of forming homogenous and continuous coats 2a, 2b which, after baking form a first continuous coating 2, of regular and airtight thickness that isolates, according to the case, the support element 1, the anodisation coat 4 or the enamel coat 4' formed on the support element 1, from the outside environment.

The spraying therefore permits obtaining a first coating 2 that does not present any over thickness or dripping.

The application of one or several very thing coats 2a, 2b permits, after baking, obtaining a first coating 2 of very slender thickness, of the order of 5 μm, practically imperceptible for the user. The user is not able indeed to distinguish, either by touch or visually, a culinary item including a first coating 2 realised in the scope of the method of the invention from a culinary item from the state of the art when deprived of such a first coating 2.

This fact is verified especially when one seeks to protect a culinary item in anodised aluminium or in anodised aluminium alloy.

The application of the second silicone-based coating 3 is realized by spraying. The second silicone-based coating 3, deposited on the first coating 2 of colloidal solution-gel type, presents excellent hydrophobic properties, which are better than those of only the first coating 2.

By way of example one observes in particular, that the measurement of the static contact angle θ° of a water drop deposited on the first coating 2 deposited on a support element in anodised aluminium indicates values between 20° and 30°, knowing that the value of θ° is close to 0° for a measurement in the case of a water drop deposited directly on the surface of a same support element in anodised aluminium not provided with a first coating 2 in accordance with the invention, the value 0° corresponding to a complete spreading of such a drop.

In the case of a culinary item in accordance with the invention is observed that the measurement of the static contact angle θ° of a water drop deposited on a silicone-based coating 5, attained values between 60° and 80°.

Besides, the culinary item in accordance with the invention presents a very sound resistance to detergents used in a dishwasher, this fact has been validated by tests that have all shown a resistance of the item according to this invention can undergo up to 300 dishwasher washing cycles, at a temperature of at least 65° C., with no deterioration of the inorganic appearance of the anodised aluminium, or the anodised aluminium alloy having been observed at the end of these 300 cycles.

The dishwasher resistance of the second non-stick coating 5, 5', that is constituted by at least a first enamel coat 5' or by at least one coat of thermostable based resin, is no longer demonstrable.

The baking of the coat or coats 2a, 2b to obtain the first coating 2, functions in a conventional manner at temperatures between 120° C. and 200° C., and preferably between 150° C. and 200° C.

The baking of the silicone-based coat 3 is carried out at a temperature between 150 and 200° C., after a drying generally performed at a temperature of 150° C. for three minutes.

It is possible to proceed in a successive manner to the different stages of baking to obtain the culinary item in accordance with the invention.

However, for obvious economic reasons, the method in accordance with the invention only includes preferably a single stage of baking permitting the simultaneous, single baking of said coat 2a, 2b and of the at least said coat intended to form the second non-stick coating 5, 5' and of said at least one coat including a silicone-based one intended to form the second coating 3.

Such a variant permits optimising the method according to the invention, indeed in the sense where the necessary baking stage for the attainment of the second non-stick coating 5, 5' is taken advantage of for the simultaneous attainment of the first coating 2 and the second protective coating 3, of the culinary item, without engendering supplementary energy expense.

It is important to note that this single baking stage, which can be implemented at a high temperature, notably between 300 and 400° C., for the sintering of thermostable resin particles and the attainment of the third non-stick coating 3, does not damage the sol-gel composition at all and permits the formation of the first 2 and second 3 coatings, which are provided with the same hydrophobic properties as if they had been baked at a temperature between 120° C. and 200° C. as recommended by suppliers for the realization of coatings from sol-gel compositions. Preferably this single baking stage is performed at a temperature of the order of 320° C., for fifteen minutes.

One can envisage different uses implementing a culinary item in accordance with the invention, that this use is intended for the cooking of food or not.

Under a non restrictive heading, will be mentioned the culinary items specifically such as casseroles, frying pans, deep fryers, grills, barbecue plates, woks, pressure-cookers.

The invention claimed is:

1. A culinary item comprising a support element and a first coating of a sol-gel baked composition, said first coating overlying at least a portion of a first face of the support element, wherein said culinary item further comprises a second coating of a silicone-based baked composition overlying at least a portion of the first coating, said silicone-based baked composition being constituted from a silicone oil or a mixture of silicone oils, or of a silicone or a mixture of silicone resins.

2. The culinary item according to claim 1, wherein the silicone-based composition comprises one of a silicone oil and a mixture of silicone oils.

3. The culinary item according to claim 1, wherein the silicone-based composition comprises one of a methyl-phenyl silicone and a methyl silicone.

4. The culinary item according to claim 1, wherein the silicone-based composition comprises one of a silicone resin and a mixture of silicone resins.

5. The culinary item according to claim 1, wherein the silicone-based composition comprises a polyester silicone resin.

6. The culinary item according claim 1, wherein the sol-gel baked composition is originally from a composition comprising a solvent and at least a first precursor and a second precursor, the first precursor being a compound of general formula $M_1(OR_1)_n$, $M_1$ being a metal, $R_1$ being an alkyl group and n being an integer number corresponding to the maximum valency of the metal $M_1$, the second precursor being a compound of general formula $M_2(OR_2)_{(n-p)}R_2'_p$, $M_2$ being a metal, $R_2$ being a alkyl group, $R_2'$ being one of a alkyl group, a phenyl group and a cyclohexyl group, n being an integer number corresponding to the maximum valency of the metal $M_2$ and p=1, $M_1$ and $M_2$ being chosen individually in the following list: Si, Zr, Ti, Sn, Al, Ce, Nb, Ln.

7. The culinary item according to claim 6, wherein the composition which the sol-gel baked composition is originally from further comprises a third precursor which is a compound of general formula $M_3(OR_3)_{(n-p)}R_3'_p$, $M_3$ being a metal chosen in the following list: Si, Zr, Ti, Sn, Al, Ce, Nb, Ln; $R_3$ and $R_3'$ being each a alkyl group, n being an integer number corresponding to a maximum valency of the metal M3 and p=2.

8. The culinary item according to claim 6 wherein the composition which the sol-gel baked composition comprises, in weight proportions:
from 10 to 50 wt % of the first precursor $M_1(OR_1)_n$, and,
from 50 to 90 wt % of the second precursor $M_2(OR_2)_{(n-p)}R_2'_p$.

9. The culinary item according to claim 7, wherein the composition which the sol-gel baked composition comprises, in weight proportions:
from 10 to 50 wt % of the first precursor $M_1(OR_1)_n$,
from 50 to 90 wt % of the second precursor $M_2(OR_2)_{(n-p)}R_2'_p$, and
from 0 to 20 wt % of the third precursor $M_3(OR_3)_{(n-p)}R_3'_p$.

10. The culinary item according to claim 6, wherein:
$M_1(OR_1)_n$ is such that $R_1$ is an alkyl in $C_1$-$C_4$; and,
$M_2(OR_2)_{(n-p)}R_2'_p$ is such that $R_2$ is a linear alkyl and $R_2'$ is an alkyl in $C_1$-$C_3$.

11. The culinary item according to claim 7, wherein:
$M_3(OR_3)_{(n-p)}R_3'_p$ is such that $R_3$ is a linear alkyl, and $R_3'$ is an alkyl in $C_1$-$C_3$.

12. The culinary item according to claim 1, wherein the thickness of the first coating is between 1 μm and 40 μm.

13. The culinary item according to claim 1, wherein the thickness of second coating is between 15 μm and 25 μm.

14. The culinary item according to claim 1, wherein the support element is one of a metallic, a glass and a ceramics element.

15. The culinary item according to claim 1, wherein the support element is one of an aluminium element and an aluminium alloy element having, at least on the first face, an anodisation coat on which the first coating is disposed.

16. The culinary item according to claim 15, wherein the anodisation coat has a thickness between 5 μm and 100 μm.

17. The culinary item according to claim 1, wherein the support element has, at least on the first face, a first coat of enamel on which is disposed the first coating.

18. The culinary item according to claim 17, wherein the enamel first coat has a thickness between 40 μm and 100 μm.

19. The culinary item according to claim 1, further comprising a third non-stick coating disposed on a second face of the support element opposite to said first face.

20. The culinary item according to claim 19, wherein the third non-stick coating has a thickness between 30 μm and 45 μm.

21. The culinary item according to claim 19, wherein the third non-stick coating is originally from a compound including at least a thermostable resin withstanding a temperature of at least 200° C.

22. The culinary item according to claim 19, wherein the third non-stick coating comprises at least a coat of enamel.

23. The culinary item according to claim 1, wherein said culinary item has a shape defined by the support element which includes a bottom from which a lateral wall raises.

* * * * *